J. Lane.
Welding Plow Shares.
No. 80,552. Patented Aug. 4, 1868.
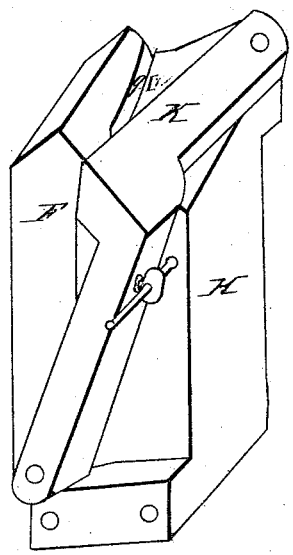
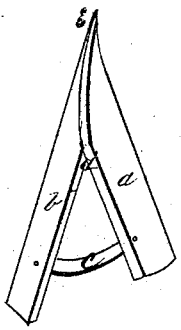
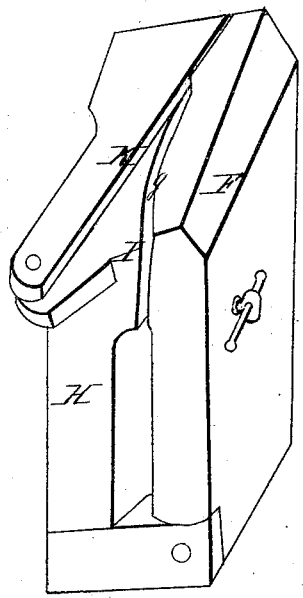
Witnesses.
Geo H Laughton
Julius A. Lane
Inventor.
John Lane

United States Patent Office.

JOHN LANE, OF CHICAGO, ILLINOIS.

*Letters Patent No. 80,552, dated August 4, 1868.*

IMPROVED APPARATUS FOR WELDING TOGETHER THE LAY AND LAND-SIDE OF A PLOW.

The Schedule referred to in these Letters Patent and making part of the same.

TO ALL WHOM IT MAY CONCERN:

Be it known that I, JOHN LANE, of Chicago, in the county of Cook, and State of Illinois, have invented a new and useful "Improved Process of Welding Plowshares;" and I do hereby declare and make known that the following is a full, clear, and exact description of the same, reference being had to the accompanying drawings, which form part of this specification.

My invention consists in welding the lay or share to the land-side of a plow by clamping them, when at a welding-heat, between the jaws of a properly-constructed vise, that shall press the parts together, effecting a secure weld, while, at the same time and heat, the smith may batter down the end of the lay and smooth it off to the face of the land-side.

Figure 1 gives a view of the plow, lay, and land-side, $a$ being the lay, $b$ the land-side, and from $d$ to E the line of weld. C is a cross-bar or brace, bolted to the lay and land-side to keep them in position while the heat and weld are being made. The lay rests on the top of the land-side at line of weld, as shown.

Figures 2 and 3 give perspective views of a vise-clamp as I prefer to make it.

It will be noticed that the arrangement of the jaws, $g$, I, and K, a matrix-mould, the form of the lay and land-side, at and near the line of weld, is shown. I sometimes combine the jaws I and K in one jaw, still preserving shape and form as before.

In operation, the lay and land-side, having been made and bent to shape, is bolted to the brace C, and the line of weld, brought to a welding-heat, is now placed in the clamp, the lay between the jaws $g$ and I, the land-side resting on the top of the jaw I and against the jaw K. The vise is now tightened, effecting a secure weld of the lay to the land-side. The smith may now batter down the end of the lay and smooth up the face of the land-side, and the work is complete.

I claim as my invention—

An improved implement for facilitating the welding together the lay and the land-side of a plow, namely, a vise, the jaws of which are so shaped as to fit the curved surface of the lay and the under-edge and inner side of the land-side, substantially as shown and described.

JOHN LANE.

Witnesses:
 GEO. H. LAUGHTON,
 JULIUS A. LANE.